United States Patent
Perry et al.

(10) Patent No.: US 6,588,102 B1
(45) Date of Patent: Jul. 8, 2003

(54) METHOD OF ASSEMBLING A FUEL INJECTOR BODY

(75) Inventors: Robert B. Perry, Leicester, NY (US); Karl Jacob Haltiner, Jr., Fairport, NY (US); James Robert Molnar, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 50 days.

(21) Appl. No.: 09/702,508

(22) Filed: Oct. 31, 2000

(51) Int. Cl.$^7$ ................................. B21K 1/22
(52) U.S. Cl. ............... 29/888.4; 29/890.125; 29/890.131; 29/525.14
(58) Field of Search ............ 29/888.4, 888.46, 29/890.124, 890.125, 890.131, 525.14, 525.13, 428, 469; 228/245, 246, 56.3; 219/121.6; 123/470, 456; 138/109, 112, 114; 239/584, 88, 125

(56) References Cited

U.S. PATENT DOCUMENTS

| | | | |
|---|---|---|---|
| 2,261,489 A | * | 11/1941 | Venton |
| 2,741,932 A | * | 4/1956 | Whitney et al. |
| 3,026,910 A | * | 3/1962 | Cawker et al. |
| 3,667,109 A | * | 6/1972 | Alcenius |
| 3,709,529 A | * | 1/1973 | Mains |
| 3,871,339 A | * | 3/1975 | Kuhn |
| 4,134,606 A | * | 1/1979 | Menti, Jr. |
| 4,335,906 A | * | 6/1982 | Cardinale et al. |
| 5,176,410 A | * | 1/1993 | Beyer |
| 5,802,716 A | * | 9/1998 | Nishimura et al. |
| 5,875,975 A | * | 3/1999 | Reiter et al. |
| 5,988,531 A | * | 11/1999 | Maden et al. |
| 5,996,910 A | * | 12/1999 | Takeda et al. ............. 29/888.4 |
| 6,029,685 A | * | 2/2000 | Carruth |
| 6,270,001 B1 | * | 8/2001 | Tadic et al. |
| 6,270,024 B1 | * | 8/2001 | Popp |
| 6,286,556 B1 | * | 9/2001 | Kato |
| 6,302,337 B1 | * | 10/2001 | Kimmel |
| 6,326,088 B1 | * | 12/2001 | Mayer et al. |
| 6,434,822 B1 | * | 8/2002 | Perry et al. ............ 29/890.124 |

\* cited by examiner

*Primary Examiner*—Gregory Vidovich
*Assistant Examiner*—T. Nguyen
(74) *Attorney, Agent, or Firm*—Patrick M. Griffin

(57) ABSTRACT

An engine fuel injector body is assembled using a furnace brazing method to provide structural and hermetic internal joints at interior locations with minimum size and processing. The method of assembling an injector with such an internal hermetic and structural joint may include the steps of providing an annular body member with an annular inner recess having an inner cylindrical surface, forming an annular end recess adjoining the cylindrical surface, fitting a tubular member into the inner recess of the body member with an outer surface of the tubular member engaging the cylindrical surface of the inner recess, placing a brazing ring in the end recess of the body member adjacent the tubular member, and furnace brazing the members together to form the internal hermetic and structural joint. Additional joints may be joined during the same brazing step.

16 Claims, 3 Drawing Sheets

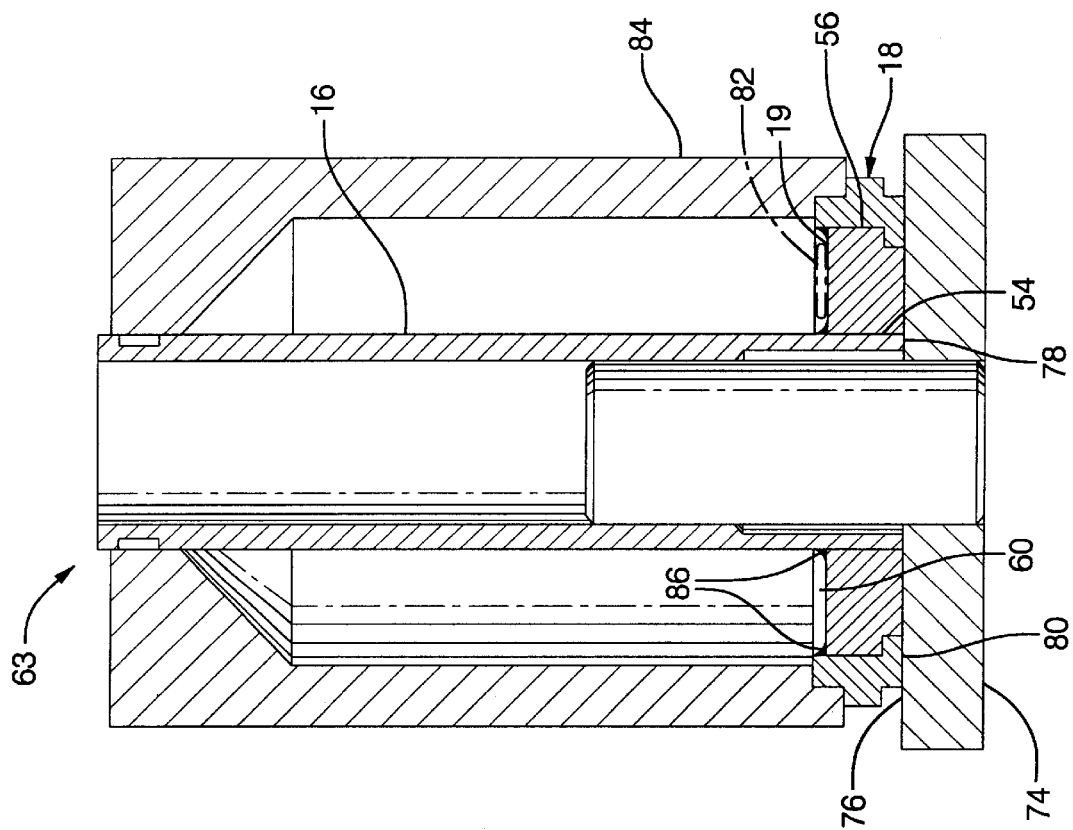
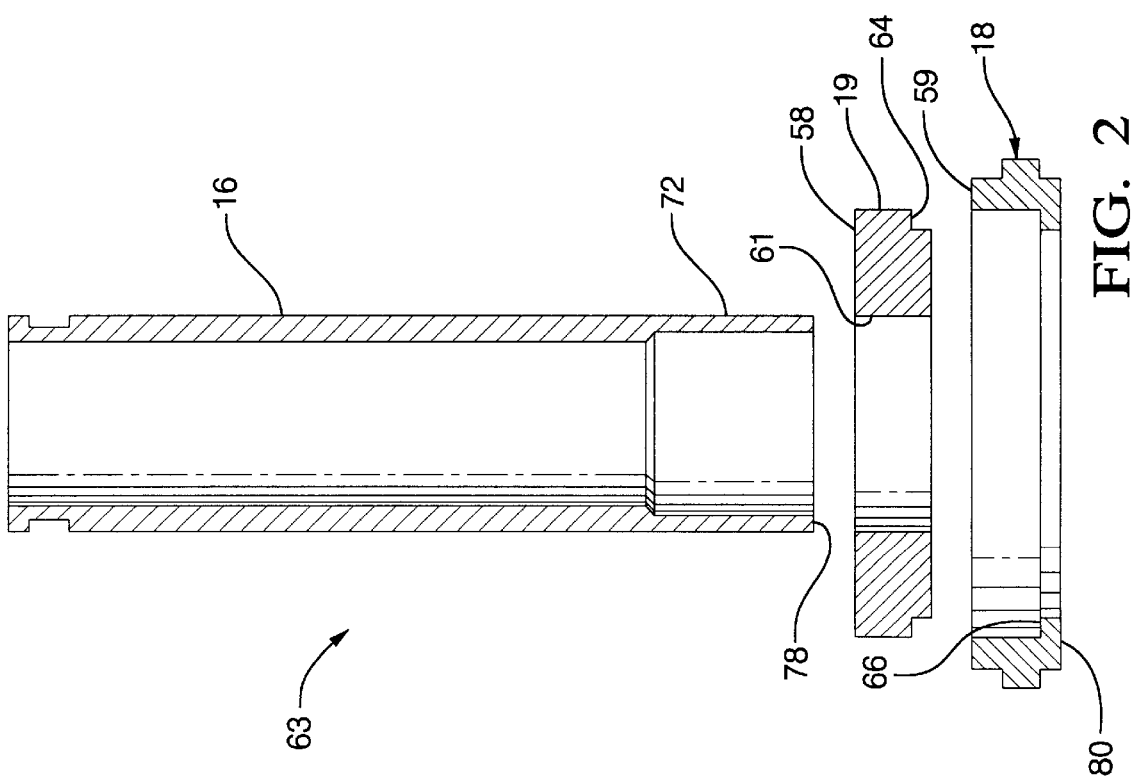

METHOD OF ASSEMBLING A FUEL INJECTOR BODY

TECHNICAL FIELD

This invention relates to fuel injectors for engines and, more particularly, to methods of assembling a fuel injector body designed to include a step of furnace brazing.

BACKGROUND OF THE INVENTION

It is known in the art relating to engine fuel injectors that joints between injector body components that carry fuel under pressure must be hermetic to prevent fuel leakage. They must also provide sufficient mechanical strength to resist a change in performance upon assembly into an engine and under adverse operating conditions. Typical joint designs for injectors utilize seam welds or elastomeric seals with a mechanical joint to provide the required performance. However, elastomeric seals may require excessive space for use in more compact injector designs. Laser seam welds may be used but require access to the joint for the laser beam which may require additional assembly steps or special design features.

SUMMARY OF THE INVENTION

The present invention provides injector designs and assembly methods which make possible the assembly of a compact injector body using a single step of furnace brazing to seal one or more joints.

As applied to related plunger and disk valve injector designs, an assembly method for a fuel injector body having an internal hermetic and structural joint includes, providing an annular body member with an annular inner recess having an inner cylindrical surface and forming an annular end recess adjoining the cylindrical surface, fitting a tubular member into the inner recess of the body member with an outer surface of the tubular member engaging the cylindrical surface of the inner recess, placing a brazing ring in the end recess of the body member adjacent the tubular member, and furnace brazing the members together to form the internal hermetic and structural joint.

Certain disk valve injectors have a body with a magnetic outer ring and a magnetic inner tube, forming outer and inner poles connected radially by outer and inner cylindrical joints to a non-magnetic spacer ring and a cylindrical inner surface of the spacer ring effectively forms an inner recess. A specific assembly method for such injectors includes positioning an upper surface of the spacer ring below upper portions of the outer ring and the inner tube to form an end recess therebetween, placing a brazing ring in the end recess, and furnace brazing the cylindrical joints to form internal hermetic and structural joints. This method fixes and seals both inner and outer joints in a single furnace brazing operation.

The addition of an additional outer member by hermetic laser seam welding is also contemplated in the methods.

These and other features and advantages of the invention will be more fully understood from the following description of certain specific embodiments of the invention taken together with the accompanying drawings.

BRIEF DESCRIPTION OF THE DRAWINGS

In the drawings:

FIG. 2 is an exploded cross-sectional view showing a partial body assembly of inner and outer pole and spacer members of the injector of FIG. 1;

FIG. 3 is a cross-sectional view showing the components of FIG. 2 assembled in a fixture for furnace brazing of the joints.

DESCRIPTION OF THE PREFERRED EMBODIMENT

Figure 1:
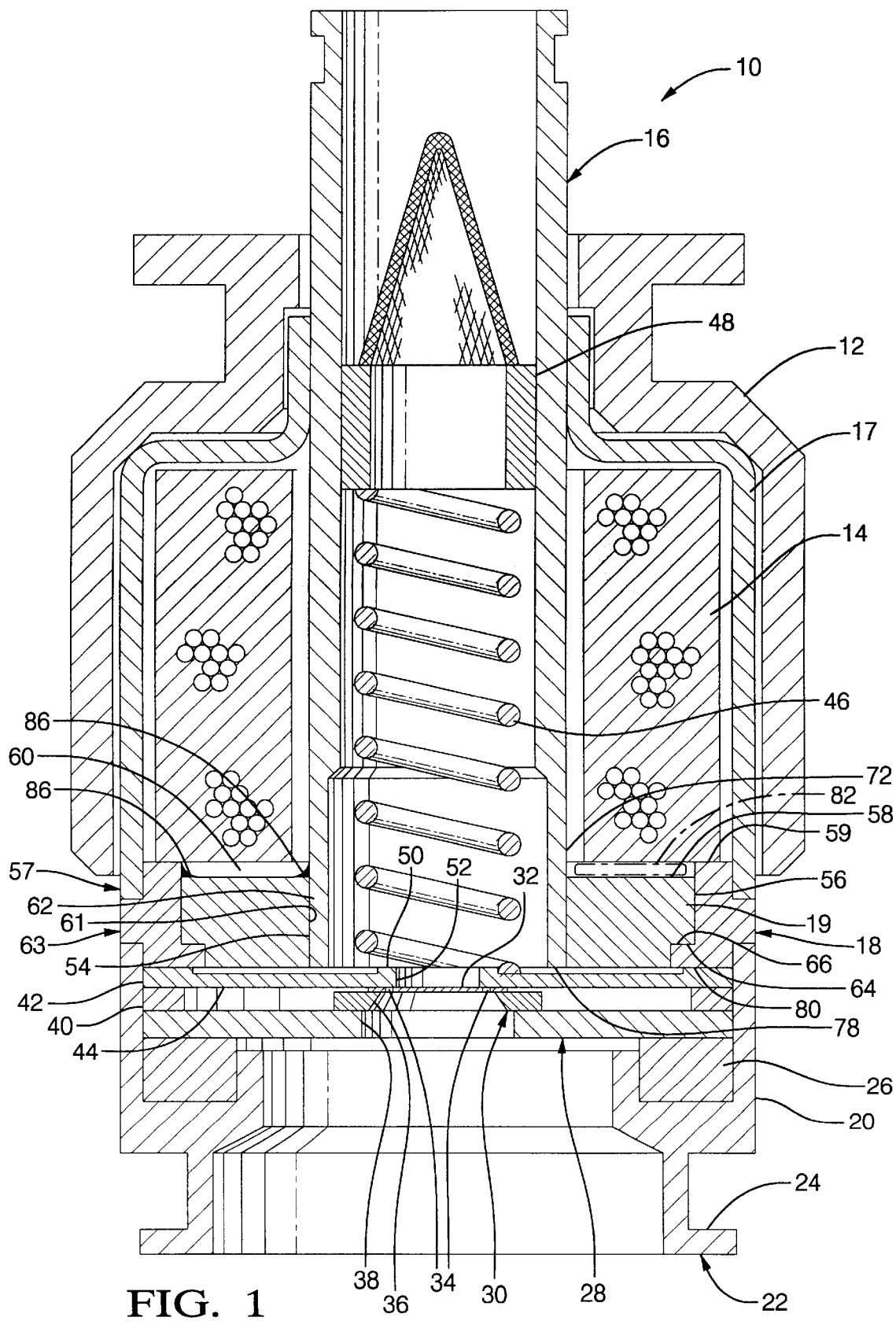
FIG. 1 is a cross-sectional assembly view of a solenoid actuated disk type engine fuel injector formed in accordance with the invention.

Referring first to FIG. 1 of the drawings in detail, numeral 10 generally indicates an exemplary solenoid actuated fuel injector for an engine. Injector 10 includes a non-magnetic cover 12 enclosing a solenoid coil 14. A fuel tube extends through the coil and acts as an inner magnetic pole 16. An outer strap 17 connects with the inner pole 16, extends around the coil 14 and connects with a magnetic outer ring forming an outer magnetic pole 18. A non-magnetic spacer provides a seal between the inner and outer poles below the coil.

The outer pole 18 connects with an annular wall 20 of a lower housing 22 defining an external seal groove 24. Lower housing 22 forms a groove supporting a mounting ring 26 on which a support disk 28 is mounted. Disk 28 includes an annular seat ring 30 carrying a combined valve seat and director plate member 32. Member 32 includes spray openings 34 positioned to discharge fuel spray through central outlet openings 36, 38 in the seat ring 30 and support disk 28, respectively and out through the lower housing 22.

Support disk 28 also supports a spacer annulus ring 40 which carries an outer flange 42 of a valve disk 44. A spring 46 in the fuel tube/inner pole 16 is compressed between a calibration sleeve 48 and a perforate inner rim 50 of the valve disk to normally bias the inner rim 50 against the valve seat of member 32, closing the spray openings 34. In use, when the solenoid coil is energized, the inner rim 50 of the valve disk is attracted to the inner magnetic pole 16. This opens the valve, allowing pressurized fuel to flow from a central opening 52 of the rim 50 through the spray holes 34 into an associated engine intake duct or cylinder.

The design of injector 10 results in a very compact assembly but requires that suitable means be provided for hermetically sealing an inner joint 54, between the inner pole 16 and spacer 19, and an outer joint 56, between spacer 19 and the outer pole 18, against leakage of pressurized fuel into the solenoid coil 14. The use of conventional elastomeric seal rings would occupy excessive space and undesirably increase the size of the injector. To use laser seam welding of the internal joints would be difficult or impractical and would require dual welding operations. The present invention solves these problems by providing an upper injector body 57 designed for and assembled in part by furnace brazing of the joints 54, 56 between the spacer 19 and the inner and outer poles 16, 18. Note that in assembly as shown in FIG. 1, the upper surface 58 of the spacer 19 lies slightly below the upper surface 59 of the outer pole 18, forming an annular end recess 60. An inner cylindrical surface 61 of the spacer ring defines an annular inner recess 62 in which the inner pole 16 is received.

Referring to FIGS. 2 and 3, the significant steps in the brazing process are illustrated. The various components of the upper body 57 (FIG. 4), including the inner pole 16, outer pole 18, spacer 19 and connecting outer strap 17 are first machined or otherwise formed to size. FIG. 2 shows the pole and spacer components that form a partial body assembly 63.

The spacer 19 is then pressed into the outer pole 18 with an annular notch 64 of the spacer engaging a mating flange 66 of the outer pole so that the upper surface 58 of the spacer lies below the upper surface 59 of the outer pole 18, forming the end recess 60 and the outer joint 56. The inner pole 16 is then slip fitted into the annular inner recess 62 with the outer surface 72 of the inner pole 16 engaging the inner cylindrical surface 61 of the spacer 19, thus forming the inner joint 54.

Referring to FIG. 3, the partial body assembly 63 is placed on a support fixture 74 having an upper surface 76 that aligns the lower surfaces 78, 80 of the poles 16, 18. A brazing ring 82 (shown by dashed lines) of suitable brazing material is placed into the end recess 60 and a tubular upper fixture 84 is located on top of the outer pole 18 to hold it down against the lower fixture. The assembly 63 is then heated in a brazing furnace, melting the brazing ring material which is drawn by capillary action into the joints 54, 56, bonding assembly 63 together as shown by the remaining brazing material 86.

Upon cooling, the brazing material forms a strong bond and a hermetic seal in the joints 54, 56 between the parts. The brazing material is generally more ductile than a welded joint and thus resists breaking of the seal under stress. Further, the dual joints are both formed in the same brazing operation, thus reducing the steps required in assembly of the components.

To complete assembly of the upper body 58, the partial body assembly 63 is cooled and the outer strap 17 is laser welded to the inner pole 16 and the outer pole 18 at the locations shown in FIG. 1. The strap may be applied by either seam or spot welding, since fuel is not present at these joints so a hermetic seal is not required.

Figure 4:
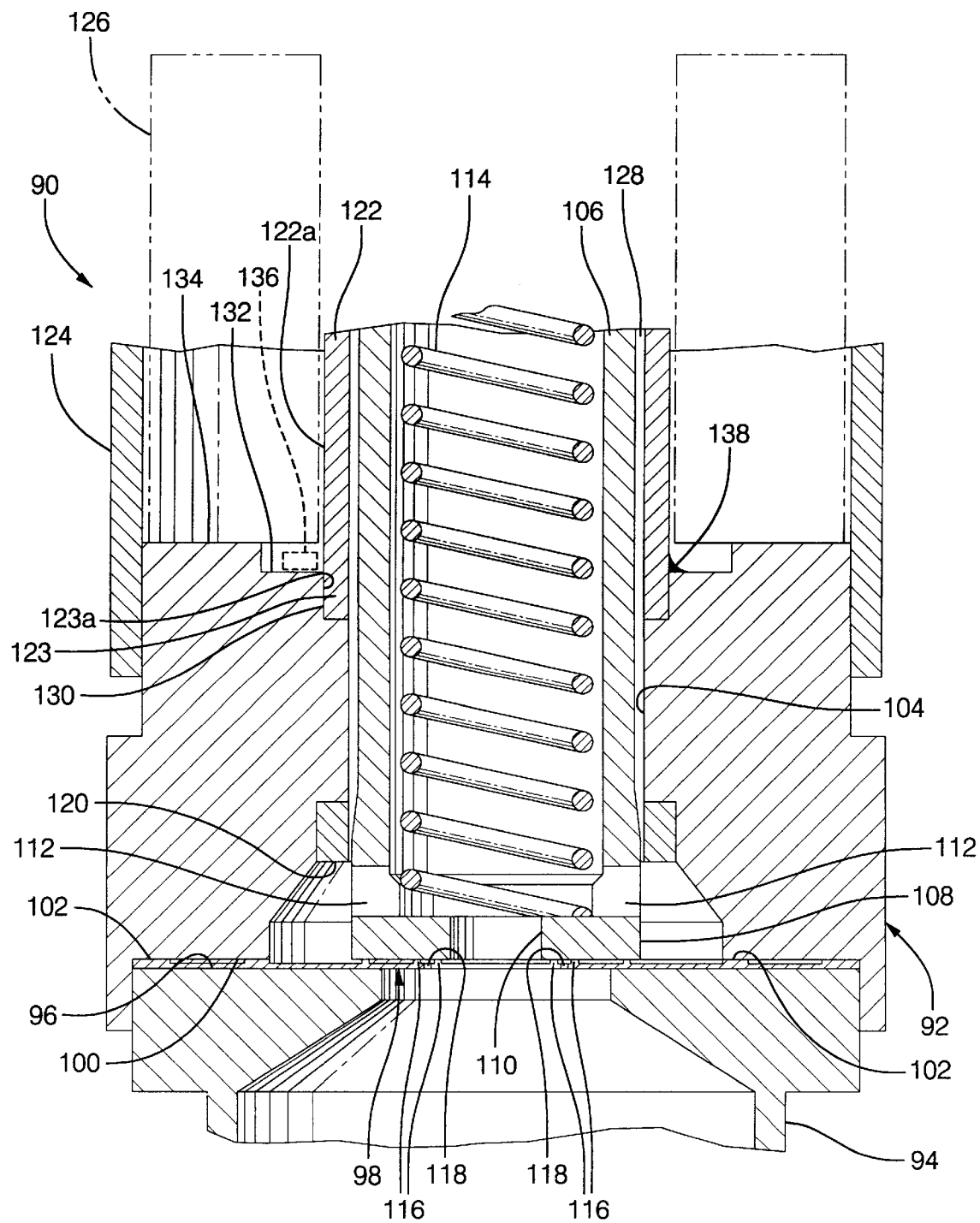
FIG. 4 is a cross-sectional assembly view of a solenoid actuated plunger type engine fuel injector formed in accordance with the invention.

Referring now to FIG. 4 of the drawings, numeral 90 indicates a plunger valve type fuel injector formed according to the invention. Injector 90 includes a valve body 92 and a seat support 94 fixed to a lower end of the valve body 92. The seat support includes a flat upper surface 96 carrying a seat member 98 that combines the functions of a valve seat and a director plate.

Valve body 92 is fixed, as by welding, to the seat support 94 and includes a flat lower surface 100 that engages outer surfaces 102 of the seat member 98 to position the member and provide a fuel seal. A central bore 104 of the valve body encloses a reciprocable valve plunger 106. The plunger is a hollow member with a lower end 108 having a central opening 110 and side openings 112 adjacent the end. A plunger spring 114 biases the plunger downward against annular seat rings 116 that form a valve seat on seat member 98. Spray holes 118 are spaced between the rings 116 and direct a fuel spray out through an open center of the seat support 94 when the valve plunger is lifted off the seat rings 116.

The plunger 106 is guided by a lower guide ring 120 and a guide tube 122, spaced axially and both fixed in cylindrical counterbores around the central bore 104 of the valve body 92. The counterbore in which the guide tube is fixed forms an annular inner recess 123 having an inner cylindrical surface 123A that engages an outer surface 122A of the guide tube 122. An outer strap 124 is secured to an outer recess of the valve body and encloses a solenoid coil 126 mounted around the guide tube 122. Since the guide tube and the bore 104 define a passage 128 for pressurized fuel in the injector, the joint 130 between the guide tube and the inner recess 123 must be hermetically sealed as well as structurally strong. This is accomplished during assembly of the guide tube into the valve body.

For this purpose, an annular end recess 132, is provided adjacent the guide tube 122 in an upper surface 134 of the valve body 92. A brazing ring 136 is placed in the end recess after the guide tube is fitted into the inner recess 123. The assembled valve body and guide tube are then heated in a brazing furnace where the brazing ring material 138 is melted and drawn by capillary action into the joint 130. Upon cooling, the brazing material 138 provides a strong and relatively ductile joint that is hermetically sealed against leakage of fuel in operation of the injector.

The method of the invention has been disclosed by reference to two differing embodiments of fuel injectors wherein claimed steps of the invention may be utilized. For assistance in claim interpretation, the following chart is provided connecting the general terms used in the claims with the more specific terms used in describing the differing embodiments.

| | Ref. Numerals and descriptive terms |
|---|---|
| Claim | Claim term |
| 1 | annular body member (body member) |
| | 19 non-magnetic spacer (spacer) |
| | 92 valve body |
| | annular inner recess (inner recess) |
| | 62 annular inner recess |
| | 123 annular inner recess (inner recess) |
| | inner cylindrical surface (cylindrical surface) |
| | 61 inner cylindrical surface |
| | 123A inner cylindrical surface |
| | annular end recess (end recess) |
| | 60 annular end recess (end recess) |
| | 132 annular end recess (end recess) |
| | tubular member |
| | 16 fuel tube & inner magnetic pole (inner pole) |
| | 122 guide tube |
| 2 | outer member |
| | 18 magnetic outer ring & outer magnetic pole (outer pole) |
| | 124 outer strap |
| 5 | magnetic outer ring (outer ring) |
| | 18 magnetic outer ring (outer ring) & outer magnetic pole (outer pole) |
| | magnetic inner tube (inner tube) |
| | 16 fuel tube & inner magnetic pole (tubular member) |
| | non-magnetic spacer ring (spacer ring) |
| | 19 non-magnetic spacer (spacer) |
| | upper surface of the spacer ring |
| | 58 upper surface of the spacer |
| | recess |
| | 60 annular end recess (end recess) |
| | inner and outer cylindrical joints (cylindrical joints) |
| | 54 inner joint |
| | 56 outer joint |
| 6 | outer member |
| | 17 outer strap |

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of assembling a fuel injector body having an internal hermetic and structural joint, said method comprising:

providing an annular body member defining an annular inner recess having an inner cylindrical surface, the body member forming an annular end recess adjoining the cylindrical surface;

fitting a tubular member into the inner recess of the body member with an outer surface of the tubular member engaging the cylindrical surface of the inner recess;

placing a brazing ring in the end recess of the body member adjacent the tubular member; and furnace brazing the members together to form the internal hermetic and structural joint.

2. A method as in claim 1 including positioning an outer member overlapping a cylindrical outer surface of the annular body member and securing the outer member to the body member outer surface.

3. A method as in claim 2 wherein the securing step is accomplished by a subsequent laser welding step.

4. A method as in claim 2 wherein the securing step is accomplished by the furnace brazing step.

5. A method of assembling a body for a fuel injector having a magnetic outer ring and a magnetic inner tube connected radially by inner and outer cylindrical joints to a non-magnetic spacer ring, said method comprising:

positioning an upper surface of the spacer ring below upper portions of the outer ring and the inner tube to form a recess therebetween;

placing a brazing ring in the recess on the upper surface of the spacer ring; and furnace brazing the cylindrical joints to form internal hermetic and structural joints.

6. A method as in claim 5 including positioning an outer member overlapping a cylindrical outer surface of the outer ring and securing the outer member to the outer surface of the outer ring.

7. A method as in claim 6 wherein the securing step is performed by laser welding.

8. A method as in claim 6 wherein the securing step is performed by laser welding.

9. A method of assembling a fuel injector body, said method comprising:

providing an annular injector body member having an inner cylindrical surface defining an annular inner recess, the body member having an upwardly facing annular end surface adjoining the cylindrical surface;

fitting a tubular injector member into the inner recess of the body member with an outer cylindrical surface of the tubular injector member closely opposing the inner cylindrical surface of the body member and extending upwardly beside the annular end surface to form an annular end recess adjacent the tubular injector member outer surface;

thereafter placing a brazing ring onto the annular end surface in the end recess adjacent the tubular injector member; and furnace brazing the members together to form an internal hermetic and structural joint.

10. A method as in claim 9 including positioning an outer injector member overlapping a cylindrical outer surface of the annular injector body member and securing the outer injector member to the annular injector body member outer surface.

11. A method as in claim 10 wherein the securing step is accomplished by laser welding.

12. A method as in claim 10 wherein the securing step is accomplished by furnace brazing.

13. A method as in claim 9 wherein the annular injector body member is an injector valve body and the tubular injector member is an injector plunger guide tube.

14. A method as in claim 9 wherein the annular injector body member is a non-magnetic spacer and the tubular injector member is an inner magnetic pole.

15. A method of assembling a body for a fuel injector, said method comprising:

positioning a non-magnetic injector spacer ring radially between a magnetic injector outer ring and a magnetic injector inner tube to form cylindrical joints between the outer ring and the spacer ring and between the spacer ring and the inner tube, an upper surface of the spacer ring being positioned at a height below upper portions of the outer ring and the inner tube to form an upwardly open recess therebetween;

placing a brazing ring in the upwardly open recess; and furnace brazing the cylindrical joints to form inner and outer internal hermetic and structural joints radially connecting the outer ring and the inner tube to the spacer ring.

16. A method as in claim 15 including positioning an outer member overlapping a cylindrical outer surface of the magnetic injector outer ring and securing the outer member to the outer surface of the outer ring.

* * * * *